United States Patent
Tilp

[15] 3,701,883
[45] Oct. 31, 1972

[54] ELECTRIC HEATER FOR COFFEE PERCOLATOR

[72] Inventor: George E. Tilp, Short Hills, N.J.
[73] Assignee: Adams Industries, Union, N.J.
[22] Filed: Dec. 21, 1970
[21] Appl. No.: 99,757

[52] U.S. Cl. .............. 219/436, 99/310, 219/336, 219/536, 417/207
[51] Int. Cl. ..................... H05b 3/02, A47j 3/44
[58] Field of Search ...... 219/436, 437, 438, 441, 442, 219/335, 336, 536, 315, 316, 318; 99/281, 282, 302, 303, 310–314, 308–309; 417/207–209

[56] References Cited

UNITED STATES PATENTS

| | | | |
|---|---|---|---|
| 1,816,994 | 8/1931 | Armstrong | 99/304 UX |
| 2,785,276 | 3/1957 | Punzak | 417/209 X |
| 3,022,411 | 2/1962 | Soper et al. | 219/441 |
| 2,864,929 | 12/1958 | Schwing | 219/335 X |
| 3,059,092 | 10/1962 | Olson | 219/441 |
| 2,817,743 | 12/1957 | Foster | 99/310 X |
| 2,248,595 | 7/1941 | Weeks | 99/281 UX |

Primary Examiner—A. Bartis
Attorney—Harry B. Rook

[57] ABSTRACT

A cup-shaped well formed of sheet metal has its side wall bulged outwardly into an exterior circumferential bead and its open end exteriorly screw-threaded and extending through a hole in the bottom wall of the percolator body. The circumferential bead is resilient and has spaced apart parallel portions perpendicular to the axis of the well and connected by an arcuate cross-section circumferential portion. One of the parallel portions of the bead abuts the bottom side of said wall, and a nut is screwed on said threaded end in abutment with the top side of said wall to fasten the well on said wall, and on the exterior of the bottom of said well is a resilient sheet metal nut to receive a screw for separably securing the base of the percolator on said body.

2 Claims, 4 Drawing Figures

PATENTED OCT 31 1972　　　　　　　　　　　3,701,883

INVENTOR.
George E. Tilp
BY
Harry B. Kook,
ATTORNEY

ELECTRIC HEATER FOR COFFEE PERCOLATOR

BACKGROUND OF THE INVENTION

1. Field of the Invention

This invention relates to means for securing an electric heater well on the bottom wall of a percolator body and for separably securing the base of the percolator on said body.

2. The Prior Art

Cup-shaped wells for electric heaters for percolators are well known and usually are cast with an integral circumferential flange and one end exteriorly screw-threaded and extending through the bottom wall of the percolator body with said flange abutting one side of the wall and a nut screwed on said threaded end abutting the other side of the wall.

In other constructions the well is formed of two nested sheet metal shells one of which has a circumferential flange at one end to abut the bottom wall of the percolator body, and the other of which has a screw-threaded end to receive a nut for clamping the bottom wall of the percolator between the nut and said flange.

An electric heating coil encircles the well beneath the bottom wall of the percolator body. In some prior art constructions there is a solid nut welded to the bottom wall of the well while in other constructions the bottom wall of the exterior shell is die formed and provided with a screw threaded opening to serve as a nut to receive a screw for separably securing the base of the percolator on the percolator body.

These prior art constructions leave much to be desired in that they are complicated and expensive.

SUMMARY

One object of the present invention is to provide novel means for securing a heater well on the bottom wall of a container such as a percolator body which will overcome the disadvantages and objections to the prior art devices and which shall be simple and inexpensive in construction.

The invention contemplates a single sheet metal cup-shaped well which has its side wall bulged outwardly, into an exterior circumferential bead, for example, by compressing or collapsing the well in a die, and the open end of the shell exteriorly screw-threaded to extend through a hole in the bottom wall of a percolator body with said circumferential bead abutting the bottom side of said wall and with a nut screwed on said threaded end in abutment with the top side of said wall to fasten the well on the wall; and the invention also contemplates a sheet metal nut formed of a single cross-shaped sheet of metal screw-threaded and shaped and bent to provide the side walls of the nut which are welded to the bottom wall of the well.

DESCRIPTION OF THE PREFERRED EMBODIMENTS

Specifically describing the illustrated embodiment of the invention, the percolator includes the usual water-containing body or vessel A, and a base or stand B for the vessel which generally is separably secured to the bottom of the body and forms a casing for the heating unit C. The body A has a bottom wall and to which the heating unit is secured, and at the bottom of the heating unit is a nut D coacting with a screw E and separably connecting the base to the body.

Figure 1:
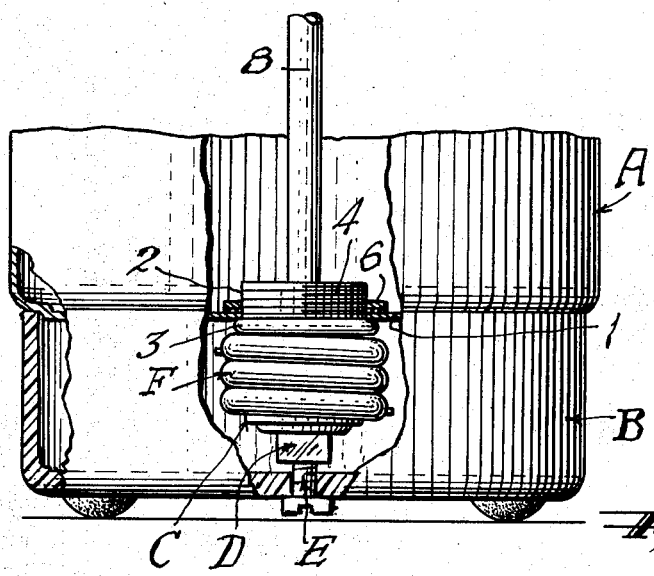
FIG. 1 is a fragmentary side elevation of a percolator body and base with portions of the body and base broken away and with the electric heater unit shown in side elevation.
Figure 2:
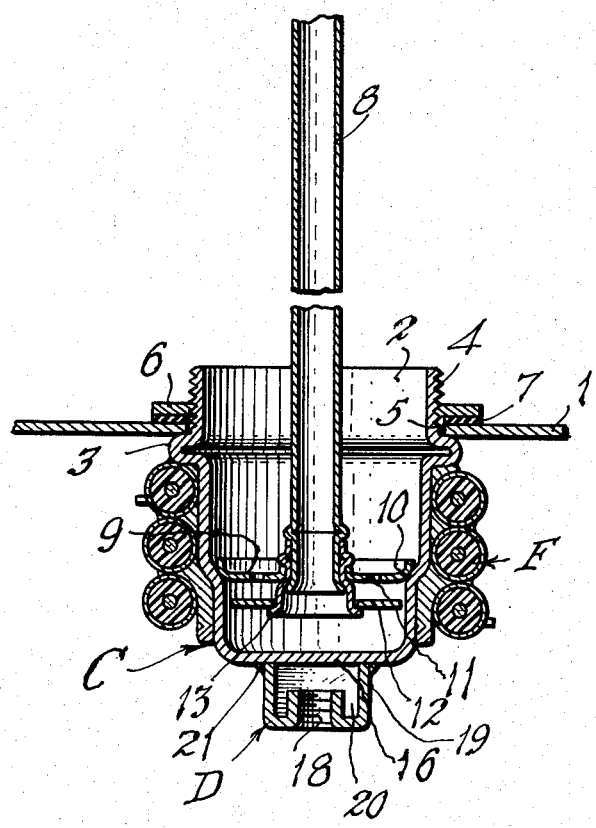
FIG. 2 is an enlarged central vertical sectional view through the heater unit and a portion of the percolator pump.
Figure 3:
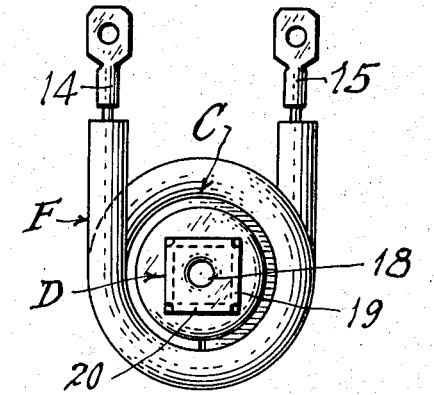
FIG. 3 is a bottom plane view of the heater unit detached from the percolator.

The heating unit includes a cup-shaped well 2 formed of sheet metal, the side wall of which has an integral circumferential bead 3 preferably formed by compressing or collapsing the cup-shaped well in a die. The open end of the well is exteriorly screw-threaded at 4 to extend through an opening 5 in the bottom wall of the body A. The well is secured to the bottom wall 1 by inserting the threaded end of the well through said opening 5 until the bead 3 abuts the bottom side of said wall and then screwing a nut 6 on the threaded end 4 into abutment with the top side of said bottom wall 1, preferably with a gasket 7 between the nut and the wall as best shown in FIG. 2.

Coacting with the well is a generally known type of pump only portions of which are illustrated in the drawings and which includes a fountain tube 8 at one end of which is rigidly connected to a plate 9 having upwardly flaring edge portions that normally seat on a tapered portion 10 of the side wall of the well. The plate 9 has apertures 11, and a valve disk 12 is loosely mounted on an outturned flange 13 in the lower end of the fountain tube below the plate 9 so that the valve disk is freely axially slidable on the fountain tube whereby the plate 9 and the valve disk 12 provide a valve mechanism by which the water is admitted from the body A into the well for heating, and after being heated is partially converted into steam which is pumped up through the fountain tube into the usual upper unit or coffee basket usually mounted on the upper portion of the tube.

The heating of the water in the well is effected by any suitable heater such as a known type of heating coil F which surrounds or encircles the well exteriorly thereof and has suitable terminal clips 14 and 15 for connecting the coil to a source of electricity through the usual thermostatic controls known in the art. Generally the heater is adapted to carry a current of the order of 500 to 1,000 watts.

Figure 4:
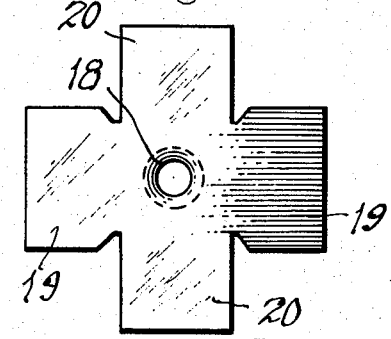
FIG. 4 is a plan view of the sheet metal blank from which the nut is formed.

Secured to the bottom wall of the well, exteriorly thereof, is the nut D. In accordance with the invention this nut is formed of a single piece of sheet material originally cross-shaped as shown in FIG. 4 having a main portion formed with a central circular flange 18 produced by extruding the metal with a sharp punch and then interiorly screw-threading the opening as by tapping to receive the shank of the screw E. The blank is initially formed with oppositely extending wings 19 and wings 20 that extend in opposite directions and approximately perpendicular to the wings 19; and these wings are bent so that each wing forms one side wall of the nut and has its edges secured to the bottom wall of the well as by welding 21.

The nut is preferably inherently resilient as shown and the headed screw E is rotatably connected to the base B so that the unit will yield upon tightening of said screw to ensure tight engagement of the base B with the body A.

The circumferential bulge 3 is preferably resilient as shown, having spaced apart parallel portions perpendicular to the axis of the well and connected by a circumferential portion which is arcuate in cross-section, one of said parallel portions abutting the bottom wall of the well so as to yield upon tightening of the nut 6 and also upon tightening of the screw E and thereby ensure a tight joint between the well and the bottom wall 1 of the body, and between the base B and the body A.

I claim:

1. The combination of a percolator body having a bottom wall with an opening therein, a heating unit including a sheet metal cup-shaped well having its open end portion exteriorly screw-threaded and extending through said opening and having a circumferential bulge in its side wall providing an exterior and circumferential resilient bead having spaced apart parallel portions perpendicular to the axis of the well and connected by a circumferential portion arcuate in cross-section, one of which parallel portions abutts the bottom side of said bottom wall, and a nut screwed on said threaded end portion and abutting the top side of said bottom wall to mount said heating unit on said bottom wall, said bead being inherently resilient to yield upon tightening of said nut and ensure a tight joint between the well and said bottom wall, and an electric heating coil encircling the side wall of said well.

2. The combination as defined in claim 1 with the addition of a base for said body, a resilient sheet metal nut having a central portion spaced from the bottom of the well with a screw-threaded opening and resilient side walls each connected at one end to and projecting angularly from said central portion and having its other end fixedly secured to the bottom wall of said well, and a screw rotatably connected to said base and screwed into said opening to connect said base firmly but resiliently to said body.

* * * * *